EMMETT N. LEITH
JURIS UPATNIEKS
INVENTORS
BY Gray, Mase and Dunson, ATTORNEYS

EMMETT N. LEITH
JURIS UPATNIEKS
*INVENTORS*

BY Gray, Mase and Dunson, ATTORNEYS

EMMETT N. LEITH
JURIS UPATNIEKS
*INVENTORS*

BY Gray, Mase and
Dunson, ATTORNEYS

EMMETT N. LEITH
JURIS UPATNIEKS
*INVENTORS*

BY Gray, Mase and Dunson, ATTORNEYS

EMMETT N. LEITH
JURIS UPATNIEKS
INVENTORS

BY Gray, Mase and Dunson, ATTORNEYS

United States Patent Office 3,548,643
Patented Dec. 22, 1970

3,548,643

HOLOGRAPHIC VIBRATION ANALYSIS METHOD AND APPARATUS

Emmett N. Leith, Plymouth, and Juris Upatnieks, Ann Arbor, Mich., assignors, by mesne assignments, to The Battelle Development Corporation, Columbus, Ohio, a corporation of Delaware Continuation-in-part of applications Ser. No. 361,977, Apr. 23, 1964, and Ser. No. 503,993, Oct. 23, 1965. This application Oct. 29, 1965, Ser. No. 505,652

Int. Cl. G01h

U.S. Cl. 73—71.3 3 Claims

ABSTRACT OF THE DISCLOSURE

A method of analyzing the average vibration of an object over a selected period of time by vibrating the object, recording the vibration thereof in the form of a hologram and reconstructing the hologram and observing the interference fringes produced on the image of the object.

This application is a continuation-in-part of our copending application entitled "Wavefront Reconstruction Using a Coherent Reference Beam" Ser. No. 361,977, filed Apr. 23, 1964, which issued Apr. 14, 1970 as U.S. Pat. No. 3,506,327, and is a continuation-in-part of our copending application Ser. No. 503,993, filed Oct. 23, 1965.

This invention concerns methods and apparatus for producing images without lenses. More particularly, it relates to methods and apparatus for capturing various patterns of electromagnetic energy emanating from or as they are transformed after passing through an object and reproducing or reconstructing those patterns in their original configuration to produce images identical in appearance to the object itself.

The usual method of producing images is by using lenses, or groups of lenses, whereby a light ray is bent or refracted when it strikes the boundary between two transparent substances. In most instances, the two transparent substances are air and a form of glass. The laws that explain the phenomena of reflection and refraction are grouped under a field of study known as geometrical optics. There are other interesting characteristics of light, and the explanation of these depends on the assumption that light consists of waves. The effects that depend upon the wave character of light are classified under the field known as physical optics. Although this invention is based upon principals of both geometrical and physical optics, the explanation of the basic concept is, in general, to be found in the field of physical optics.

The problem of producing clear images, three-dimensional images, colored images, enlarged images, etc., has long been attacked by attempting to provide better lenses, better film emulsion, multiple exposures, and other similar techniques and materials. Usually an image is produced by attempting to reconstruct the light patterns as they exist at the surface of the object. Thus, if one can substantially reproduce all the points on the surface of an object, either as light and dark points or as colored points, the image is considered good. Conventionally a lens, a lens system, or an optical system is used to bend light rays emerging (by reflection or other means) from a point on an object to produce a corresponding point separated in space from the original. A collection of such points forms an image. In seeking to provide a well-constructed image, much time and money are required in prior processes to correct optical system aberrations and to select materials that produce fewer defects in the process of light reflection and transmission.

One object of this invention is to provide a method of recording electromagnetic wavefronts emanating from or through an object and reconstructing the wavefronts substantially identical to their original form.

Another object of this invention is to provide a method of reproducing recorded wavefront information.

Still another object of this invention is to provide a method of detecting and recording the vibration of an object.

In this invention, the wavefronts of light rays emerging from an object are captured by a detecting device (preferably a photographic plate or film) to form a pattern and the wavefronts are reconstructed from, and focused by, the detection device to produce an image that has the same characteristics as an image produced by the original object and an aberration-corrected optical system. According to the present invention, if one moves the eye around in the area where the reconstructed wavefronts are focused, one does not see clearly those points that were on a direct line between the object and the detecting device, but one sees new points come into view as others go out of view, so that one can look "behind" or around structures in the foreground to see structures in the background. The phenomenon gives one the impression that the image is created by a lens system and that the original object is still present, as stated above, or that one is looking through a window at the original object or scene.

Briefly described, this invention includes a method and apparatus for producing images without lenses comprising, illuminating an object with a source of coherent light, positioning a detecting device to receive light from the object, positioning means for directing a portion of the coherent light onto the detecting device to produce a pattern, and illuminating the pattern on the detector with coherent light to reconstruct a three-dimensional virtual image and a three-dimensional real image.

The pattern recorded on the detecting device is, for convenience, called an off-axis hologram or hologram. For convenience, in the description that follows, the coherent radiation is most frequently referred to as "light" since this is generally more comprehensible than other forms of radiation; however, it should be understood that visible and invisible radiation will, in most instances, be applicable to the methods and apparatus described.

A preferred source of coherent light is the light produced by a laser and the preferred detector is a photographic plate. Present lasers do not produce "absolutely" coherent light, but light that is coherent over a distance that is great enough to serve the purposes of the methods and apparatus described herein. Consequently, when the term "coherent" is used herein it refers to light of about laser coherence.

The orientation of the portion of coherent light that is directed onto the detecting device determines the position of the images formed by the hologram resulting from the interference between the "object-bearing" beam and the directed or reference beam.

Each point on the object produces a pattern that extends over the entire detecting means and any portion of that pattern will reproduce that point for reconstruction of the image. Thus, the detecting means can be broken or cut into pieces and from each piece an image the same size as the original but of less intensity can be produced if the intensity of the illuminating source is the same for both forming the hologram and reproducing the light waves. However, if the illuminating light is concentrated to the size of one piece the image reproduced from that piece retains its original intensity.

The radiation for producing the hologram, as previously stated, need not be light. Any radiation that can be detected and captured by a detecting device will suffice. For example, photographic plates are sensitive to infrared, ultraviolet, X-rays, and gamma-rays. The invention, therefore, operates with many "types" of radiation. With photographic plates as detectors, it is possible to produce images using radiations having wavelengths of from $10^{-11}$ cm. to $10^{-1}$ cm., the visible spectrum comprising only those wavelengths in the range between $4\times10^{-5}$ cm. (extreme violet) and $7.2\times10^{-5}$ cm. (deep red). According to this invention, since no lenses are involved, radiation that cannot be refracted by ordinary lenses can be put to use to produce types of images heretofore impossible, for example, magification of shadow images formed from X-rays produced from a coherent source.

Still another advantage of this invention is that it may employ detecting devices sensitive to all the same radiations as any photographic process, whereby images may be produced with radiations outside the visible spectrum.

Still another advantage of this invention is that the detecting device may be divided into numerous pieces and each piece can be used to reconstruct the total image. Still other objects and advantages of this invention will be apparent from the description that follows, the drawings, and the appended claims.

In order to provide a background for understanding the invention described herein, a brief discussion of certain principles in the field of physical optics is given. Amplification of these principles will be found in textbooks dealing with the subject. FIGS. 1–6 are related to the invention only in that they are used to illustrate certain details of this discussion intended to provide background information preliminary to the actual description of the invention.

Figure 1:
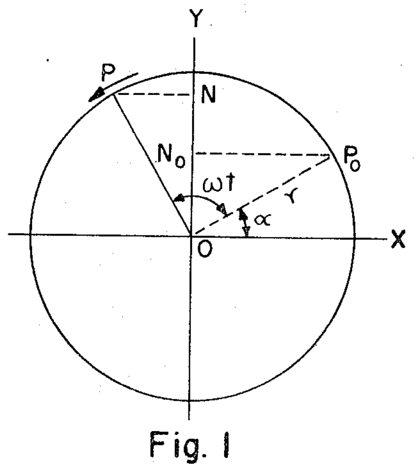
FIG. 1 is a diagram showing a reproduction of the motion of a particle influenced by a sine wave.

According to the theory of wave motion, the passage of a train of waves through a medium sets each particle of the medium into motion. Wave motions can be studied by determining the action of such particles as they are passed by the waves. For example, a particle of water, although participating in the formation and destruction of a passing wave, does not travel with the wave but, ideally, moves up and down in the crest and trough of the waves as it passes. A periodic motion is one which repeats itself exactly in successive intervals of time. At the end of each interval, the position and velocity of the particle is the same as the initial position and velocity and the time between such occurrences is called a period. The simplest type of periodic motion along a straight line is one in which a displacement (designated as $y$) is given by the equation:

$$y=r\sin(\omega t+\alpha) \qquad (1)$$

where $r$ is called the amplitude of the motion, $\omega$ is the angular velocity in radians per second, and $t$ is the time in seconds, and $\alpha$ is the phase constant. The entire angle $(\omega t+\alpha)$ determines the position of the particle (N) at any instant and is called the phase angle or simply "the phase." The position of N at zero time ($t=0$) is determined by the angle $\alpha$ which is the initial value of the phase. FIG. 1 shows a construction for determining the position of the particle N at any time. This comprises a circle of radius $r$ having its center at the origin of a coordinate system. The horizontal projection of point P moving on the circumference of such a circle at a constant angular velocity $\omega$, reproduces the displacement of a particle influenced by a sine wave. Point $P_o$, corresponding to the position of the particle at time $t=0$ is displaced from the axis by an angle and magnitude of the initial displacement is represented by the distance $N_0$ measured along the Y axis. After a period of time the position of the particle ($P_1$) will be determined by the angle $(\omega t+\alpha)$ and the displacement will be $N_1$ measured along the Y axis. As the point P moves around the circle and again arrives at $P_0$, it will have completed a "period" and its projection N will have described one complete cycle of displacement values.

Figure 2:
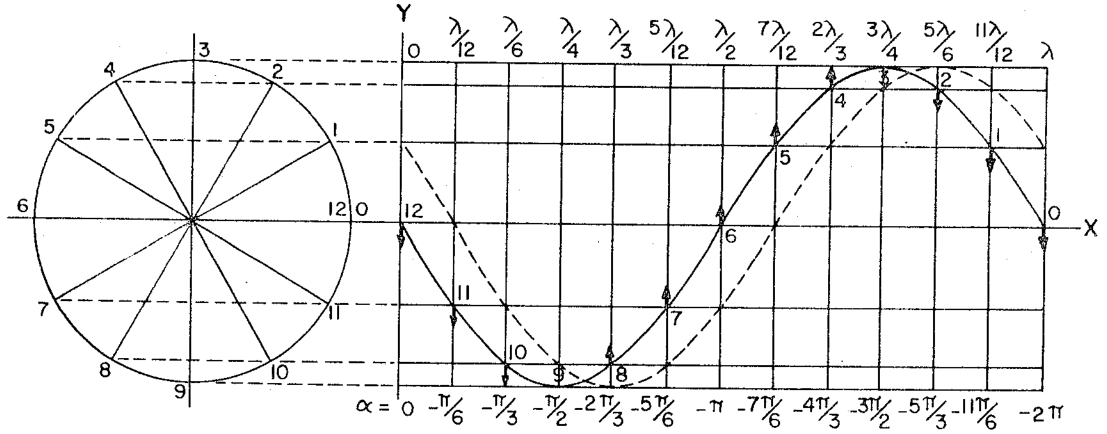
FIG. 2 is a diagram of two sine waves that are thirty degrees out of phase.

FIG. 2 shows graphically the displacement pattern of a particle through one cycle of a sine wave. A group of 12 points has been projected onto a curve, and by connecting such points a picture of the wave appears. A solid line shows a wave where the initial phase angle $\alpha$ was zero, and the broken line shows a wave where the initial phase angle was 30° or $\pi/6$. The direction of motion of the particle at each position, on the solid line, is indicated by the arrows in FIG. 2. The phase difference in the two waves shown is important in that if the two waves were to be projected through the same medium and oriented along the same axis, at the same time, the result of the particle motion would be an addition of the two waves to form a compound wave. At those points where the waves tend to make the particle move in the same direction, the height or depth (intensity) of the compound wave would be increased, and, at those points where the waves tend to influence the particle to move in opposite directions, they tend to cancel each other out so that the resultant compound wave is moved toward the axis along which it travels. The entire length of the wave, or wavelength, is designated $\lambda$. In FIG. 2 the waves are out of phase by the angle $\pi/6$, in distance $1/2\lambda$. If they were out of phase by one-half of a period $\pi$ (or $1/2\lambda$), the peaks and valleys would fall in opposite directions and they would tend to cancel each other out. If the waves were exactly in phase, i.e., on top of one another, the peaks and valleys would reinforce one another so that the resultant compound wave would have twice the amplitude of either single wave.

Figure 3:
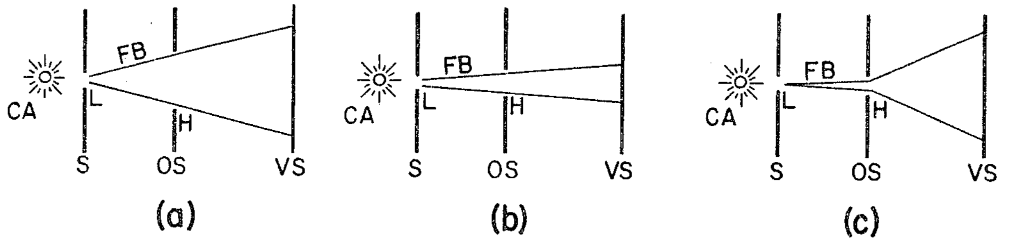
FIG. 3 is a diagram for demonstrating the diffraction of light.

An interesting characteristic of light is exhibited if one attempts to isolate a single "ray" of light by the method shown in FIG. 3. In FIG. 3*a*, a light source of the smallest possible size is represented by L which might be obtained by focusing the light from the white-hot positive pole of a carbon arc (represented by CA) on a metal screen S pierced with a small hole. This is a convenient way of approximating a "point source" of light which produces a type of coherent light. Coherent light is necessary to this invention and is described later. If another opaque screen OS, provided with a much larger hole H, is positioned between L and a viewing screen VS, only that portion of the viewing screen VS lying between the straight lines FB drawn from L will be appreciably illuminated, as shown in FIG. 3*a*. If the hole H is made smaller, as in FIG. 3*b*, the illuminated area on the screen VS gets correspondingly smaller, so that it appears that one could isolate a single ray of light by making the hole H vanishingly small. Experimentation along this line reveals, however, that at a certain width of H (a few tenths of a millimeter)

the bright spot begins to widen again (FIG. 3*c*). The result of making the hole H very small is to cause the illumination, although very weak, to spread out over a considerable area of the screen. When waves pass through an aperture, or pass the edge of an obstacle, they always spread to some extent into the region which is not directly exposed to the oncoming waves. The failure to isolate a single ray of light by the method described above is due to the process called "diffraction." In order to explain this bending of light, the rule has been proposed that each point on a wave front may be regarded as a new source of waves. The most obvious diffraction effects are produced by opaque obstacles although diffraction is produced by obstacles which are not opaque. For example, diffraction fringes may be produced by air bubbles imprisoned in a lens. Diffraction is produced by any arrangement which causes a change of amplitude or phase which is not the same over the whole area of the wave front. Diffraction thus occurs when there is any limitation on the width of a beam of light.

Figure 4:
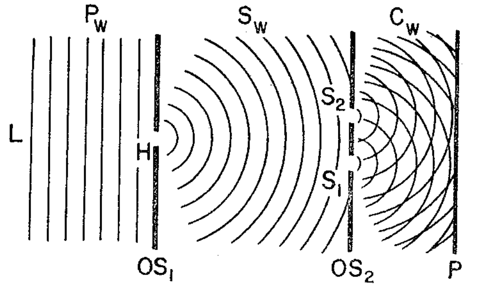
FIG. 4 is a diagram showing the interference of light from a coherent source passing through two slits.

If one were to drop two stones simultaneously in a quiet pool of water, one would notice two sets of waves crossing each other. In the region of crossing, there are places where the disturbances are practically zero and others where it is greater than that which would be given by either wave alone. This phenomenon, called the principle of superposition, can also be observed with light waves. FIG. 4 is a diagram illustrating such a phenomonen. The light source L, effectively located at infinity (this effect can be accomplished by using a lens that collimates the light), emits parallel waves of light PW. The waves of light PW strike an opaque screen $OS_1$ having a hole H and the light that gets through the hole H diffracts to form spherical waves SW that pass to a second opaque screen $OS_2$. The second opaque screen $OS_2$ has two slits $S_1$ and $S_2$, the light waves are diffracted in a cylindrical wave front pattern as indicated by the designation CW. If the circular lines, designated CW, represent crests of waves, the intersection of any two lines represents the arrival at these two points of two waves with the same phase, or with phases differing by multiples of $2\pi$ (or $\lambda$). Such points are therefore those of maximum disturbance or brightness. A close examination of the light or the screen P will reveal evenly spaced light and dark bands or fringes.

The two interfering groups of light waves CW are always derived from the same source of light L. If one were to attempt the above experiment using two separate lamp filaments set side by side, no interference fringes would appear. With ordinary lamp filaments, the light is not emitted in an infinite train of waves. Actually, there are sudden changes in phase that occur in a very short interval of time (in about $10^{-8}$ seconds). When two separate lamp filaments are used, interference fringes appear but exist for such a very short period of time that they cannot be recorded. Each time there is a phase change in the light emitted from one of the filaments, the light and dark areas of the fringe pattern change position. The light emitted from the two slits $S_1$ and $S_2$ in FIG. 4 (and other similar arrangements) always have point-to-point correspondence of phase, since they are both derived from the same source. If the phase of the light from a point in one slit suddenly shifts, that of the light from the corresponding point in the other slit will shift simultaneously. The result is that the difference in phase between any pair of points in the two slits always remain constant, and so the interference fringes are stationary. If one is to produce an interference pattern with light, the sources must have this point-to-point phase relation and sources that have this relation are called "coherent sources."

If the number of slits in the screen $OS_2$, is increased and the slits are equidistant and of the same width, the screen $OS_2$ becomes a diffraction grating. When this is done, the number of waves of the type CW increases and the number of interference points increase. The result is that the evenly spaced light and dark bands on the screen change their pattern somewhat as the number of slits is increased. The pattern is modified as the number of slits is increased by narrowing the interference maxima (so that the bright bands on the screen are decreased in width). If the screen P in FIG. 4 is a photographic plate, a series of narrow light bands is produced which may in turn serve as a diffraction grating itself. Two kinds of diffraction pattern are recognized and defined by the mathematics that treats them, i.e., Fresnel diffraction and Fraunkofer diffraction. The latter occurs when the screen on which the pattern is observed is at infinite distances; otherwise the diffraction is of the Fresnel type. This invention is mostly concerned with Fresnel diffraction.

Figure 5:
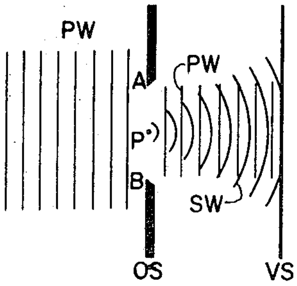
FIG. 5 is a diagram based on the theory of diffraction of light.
Figure 6:
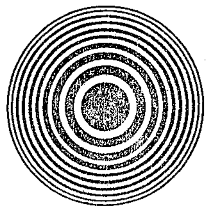
FIG. 6 is a diagram of a Fresnel zone plate.

Diffraction also occurs with an opening having an opaque point positioned in the opening. FIG. 5 shows the pattern of light waves produced when the light source is positioned at infinity and parallel waves PW arrive at an opening AB in an opaque screen OS. A point P is positioned in the opening AB and acts like a source producing a train of concentric spherical waves SW, centered at the opaque point P. These wavelets SW combine with the direct beam of waves PW to produce a series of concentric interference rings on the screen VS such as that shown in FIG. 6 wherein each white area of the pattern is equal to each of the other white areas and each are covered by a black ring which is equal to each of the other black areas. This pattern is referred to as a zone plate. If the zone plate pattern is again exposed to coherent light, it will produce a point of light of great intensity on its axis at a distance corresponding to the size of the zones and the wavelength of the light used, i.e., the light is focused by a pattern rather than a lens. The Fresnel zone plate appears to act as a type of lens. Furthermore, if a small object is positioned in the hole AB of the screen OS of FIG. 5, a Fresnel diffraction pattern is formed from the small object. It would appear that it would be possible to capture a multiple Fresnel diffraction pattern for each point on an object and pass the light throught he captured multiple pattern to form an image. To a certain extent, this is true, but it is not quite so simple.

Two major difficulties are encountered if one attempts to produce an image by illuminating an object with coherent light using a point source as described above. First, the light from a point source is very weak. This difficulty is overcome by using the light emitted from a laser. Laser light has the property of point-to-point correspondence of phase, which simply means it produces the coherent light necesary for generating the Fresnel diffraction pattern. Assume that a laser beam is directed onto a photographic transparency and that a photographic plate is positioned to capture the Fresnel diffraction patterns resulting therefrom. When coherent light is directed onto the developed plate, a crude image appears. This occurs only with a relatively simple object that transmits a large portion of the light through the object without scattering. The primary difficulty with the process (and accordingly with many three-dimensional imaging processes) is that the phase of the incident beam (the beam directed onto the transparency) is lost. This, in general, makes the reconstruction of an image impossible. If a portion of the light passing through the transparency is not scattered, some of the phase is retained, so that the reconstruction of very simple objects, such as black lettering on a white background, is possible. When the object illuminated is more complicated, the loss of phase exacts its toll and light "noise" is generated so as to completely obscure the image if one attempts to reconstruct it. The above process was developed by Dr. D. Gabor of England in 1949 and the captured pattern was called a hologram of the in-line or on-axis type.

Figure 7:
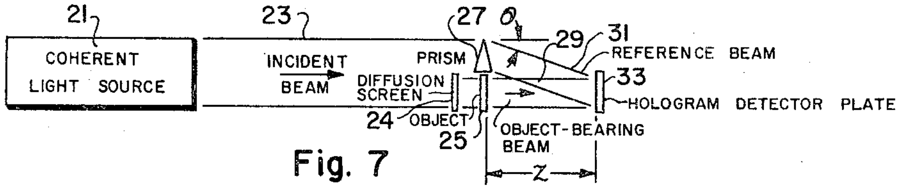
FIG. 7 is a diagram illustrating a method for producing an off-axis hologram.

A two-beam interferometric process may be used to produce a pattern of fringes on a detecting device (such as a photographic plate), and this is called a hologram of the off-axis type. FIG. 7 shows this process in operation. A coherent light source, such as a laser 21, produces an incident beam 23 illuminating a transparency or object 25 and a prism 27. In order to produce images of improved quality, a diffusion screen 24 (such as a ground glass) is placed between a light source 21 and the object 25. The light passing through the transparency produces a beam of scattered light 29 that carries the Fresnel diffraction pattern of each point on the object 25, some of which is captured by a detector such as a photographic plate 23 positioned at a distance $z$ from the object 25. The phase relationship in the beam 29 is almost completely destroyed. The prism 27 bends the other portion of the incident beam 23 through an angle $\theta$ directing a beam of light 31 onto the plate 33. This light in beam 31 has retained its phase relationship and produces a pattern of interference fringes with the Fresnel fringes being transmitted in beam 29. The result is a combination of multiple Fresnel patterns and interference fringes, producing an off-axis hologram. The incident beam 23, deflected through an angle $\theta$, to form the reference beam 31, is preferably about 2 to 10 times stronger in intensity than beam 29.

Figure 8:
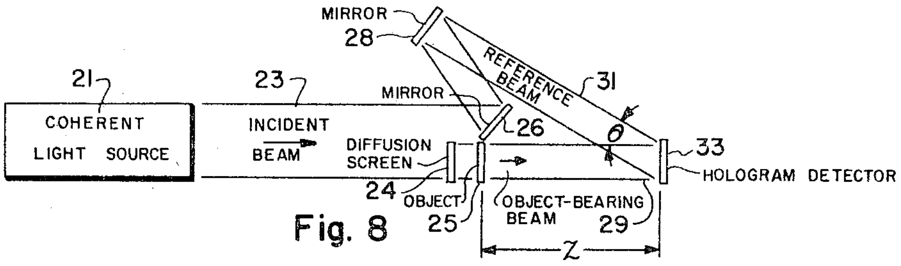
FIG. 8 is a diagram illustrating a method similar to that of FIG. 7 for producing an off-axis hologram.

FIG. 8 shows a second method of producing an off-axis hologram. The difference between the arrangement shown in FIG. 7 and that of FIG. 8 is that a first mirror 26 is positioned in the incident beam 23 and reflects a portion of the incident beam 23 to a second mirror 28 which in turn reflects the light as a reference beam 31 onto the plate 33. This produces the same result as that of FIG. 7. Still another method (not shown) is to place a beam splitter in the incident beam so that part of the light passes to the object and the other portion is reflected to a mirror that reflects light to the plate to form the reference beam.

Figure 9:
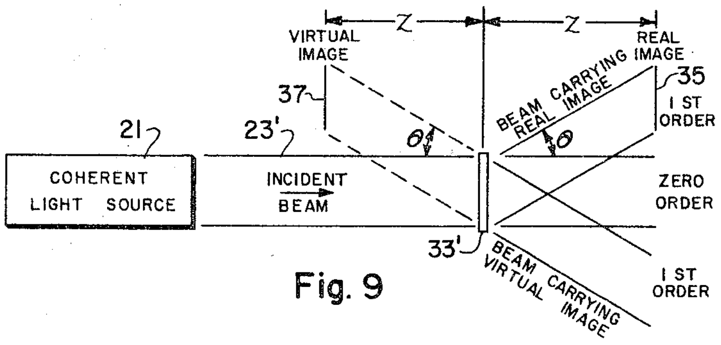
FIG. 9 is a diagram illustrating a method for reconstructing the images from an off-axis hologram.

After the photographic plate is developed, reconstruction is accomplished according to the diagram of FIG. 9. The off-axis hologram 33' is illuminated to an incident beam 23 of coherent light and a real image 35 forms at a distance $z$ on one side of the hologram 33', and a virtual image 37 forms at a distance $z$ on the other side of the actinogram 33'. The fine line structure of the hologram 33' causes the actinogram 33' to act like a diffraction grating, producing a first-order pair of diffracted waves, as shown in FIG. 9. One of these produces the real image 35, occurring in the same plane as a conventional real image, but displaced to an off-axis position through the angle $\theta$. The angle $\theta$ and the distance $z$ will be the same in the reconstruction process as they were in the hologram-forming process if the same wavelength of light is used in both instances. The images 35 and 37 are of high quality and either the real image 35 or virtual image 37 can be photographed. The real image 35 is more convenient to use since the real image 35 can be recorded by placing a plate at the image position, determined by the distance $z$ and the angle $\theta$, thus avoiding the need for a lens. Hence, the entire process may be carried out without lenses.

The density pattern produced on the plate 33 is such that if one wanted to produce the hologram 33' artificially, for example, by hand-drawing the appropriate pattern and photographing it onto a plate, one would do so in the following manner; each point on the object interferes with the reference beam to produce a fringe pattern in which the fringes are circular and concentric, with the outer fringes being more closely packed than the inner ones. The fringe pattern is like a section taken from the Fresnel zone plate (FIG. 6) except that the fringes are shaded, going gradually from transparent to black and then to transparent, whereas the fringes of the usual Fresnel zone plates go from transparent to black in a single, abrupt step. If an object is thought of as a summation of many points, then each point produces a pattern like the one described, but such pattern is displaced from those produced by other points in the same manner that the points themselves are displaced from each other. The hologram is thus a summation of many such zone-plate sections, and one could produce an artificial hologram by drawing a superimposed zoned plate pattern. Of course, the process would be very difficult and could only be done for the simplest objects.

In the absence of the reference beam 31, the photographic plate 33 produces a conventional diffraction pattern. Let the light reflected by the object be a function S of $x$ and $y$, i.e., $S(x, y)$ and the photographic plate receive the light in accordance with the function $S_0$ of $x$ and $y$ or $S_0(x, y)$. The function $S_0(x, y)$ is a complex quantity having both amplitude and phase, the polar form of which is $$S_0(x, y) = a(x, y)e^{j\phi}(x, y) \qquad (2)$$

where $a$ is the amplitude modulus and $\phi$ is the phase of the impinging light. The photographic plate records only the amplitude factor $a$; the phase portion $e^{j\phi}$ is discarded. The conventional fringe pattern is thus an incomplete record.

The interference pattern produced when the second beam, which is called the reference beam 31, is present, is called a hologram 33' of the off-axis type. It is characterized by the fact that the phase portion $\phi$ of the Fresnel diffraction pattern is also recorded. If the reference beam 31 has an amplitude modulus $a_0$, it will produce at the detector or photographic plate 33, a wave of amplitude $a_0e^{j\alpha x}$, where the phase term $e^{j\alpha x}$ results from the beam impinging on the plate 33 at an angle. A beam impinging on a plane at an angle $\theta$ produces (for small values of $\theta$) a progressive phase retardation factor indicated by the exponent $(j2\pi x\theta/\lambda)$ across this plane. Hence we have the relation $\alpha = 2\pi\theta/\lambda$.

When the reference beam is present, the light distribution at the hologram recording plane is $a_0e^{j\alpha x} + ae^{j\phi}$. Let us assume that the plate which records this distribution has a response which is linear with intensity, that is, suppose the amplitude transmittance of the plate after development to be given by $$T = T_0 - kI \qquad (3)$$

where I is the intensity distribution at the photographic plate 33, $$I = |a_0e^{j\alpha x} + ae^{j\phi}|^2 \qquad (4)$$

and $T_0$ and $k$ are constants determined by the transmittance exposure characteristic of the plate. Equation 3 is, in general, a reasonable approximation to the actual characteristic over a transmittance between about 0.2 and 0.8, measured relative to the base transmittance. The resultant transmittance of the recording plate is, therefore, $$T = T_0 - k|a_0e^{j\alpha x} + ae^{j\phi}|^2 = T_0 - ka_0^2 - 2ka_0a \cos(\alpha x - \phi) \qquad (5)$$

the plate thus behaves like a square-law modulating device producing a term $2ka_0a \cos(\alpha x - \phi)$ which is the real part of the original Fresnel diffraction pattern, modulated onto a carrier of angular frequency $\alpha$. In the absence of a diffracting object, this term represents a uniform fringe pattern produced by the interference between the two beams. When a diffracting object is present, its Fresnel diffraction pattern modulates this fringe pattern. The amplitude modulus of the diffracting pattern produces an amplitude modulation of the fringes, and the phase portion $\phi$ produces a phase modulation (or spacing modulation) of the fringes.

The present process permits the photographic plate to record both the amplitude modulus and the phase of the Fresnel diffraction pattern. The complete demonstration of this requires that the final term of Equation 5 be separable from the remaining terms. The actual method for the reconstruction process has been described and discussed with reference to FIG. 9.

When the hologram 33' is placed in the collimated beam of monochromatic light, as shown in FIG. 9, the bias term $T_0 - ka_0^2$ and the term $ka^2$ combine to form a reconstruction that is essentially the reconstruction produced by the pattern formed when the carried 31 is not used. From these terms, a real image is formed at a distance $z$ on one side of the hologram 33' and a virtual image is formed at an equal distance on the other side of the hologram 33' (these are the low quality conventional images). As was previously mentioned, the fine-line structure of the hologram which causes the actinogram to act like a diffraction grating produces a pair of first-order diffracted waves from the term $ka_0a \cos(\alpha x - \phi)$. As seen from FIG. 9, the light component comprising the two off-axis images are nonoverlapping and both components are removed from the region where the conventional reconstruction occurs (these two images are the high-quality images that we seek). A comprehensive mathematical analysis supporting these contentions can be given. However, for the present purpose, if the term $ka_0a \cos(\alpha x - \phi)$ of Equation 5 is rewritten in its exponential form, $$(\tfrac{1}{2})ka_0ae^{j(\alpha x-\phi)}+(\tfrac{1}{2})ka_0ae^{-j(\alpha x\phi)}$$

it is seen that the first exponential term is to within a constant multiplier and the exponential term $e^{j\alpha x}$, exactly the complex function that describes the Fresnel diffraction pattern produced at the plate 33 by the object 25. This term can therefore be considered as having been produced by a virtual image at a distance $z$ from the hologram 33'. The factor $e^{j\alpha x}$ alters this view only in that it results in the virtual image being displaced laterally a distance proportionate to $\alpha$. The conjugate term $(\tfrac{1}{2})a_0e^{-j(\alpha x-\phi)}$ produces the real image, which likewise is displaced from the axis, as implied by the factor $e^{-j(\alpha x-\phi)}$.

The results of the method just described are based on the square-law characteristics of the recording plate, as given by Equation 3 and the proper term for the recording plate is a "square-law detector." If this relation is only approximately obtained, there will be higher-order distortion terms present on the hologram. These will, for the most part, give rise to second and higher-order diffracted waves, which, in the reconstruction process, will form additional images at greater off-axis positions, and will therefore be separated from the first-order images. Hence, while the production of higher-order diffracted waves is assumed to be a specific and approximately realized film characteristic, the actual characteristic is not at all critical to the process, and in no way is it necessary or apparently even desirable to consider controlling this characteristic.

By controlling the relative amplitude of the object-bearing beam 29, for example, by the use of attenuating filters placed in one of the beams, the contrast of the fringe pattern can be controlled. If this contrast were made sufficiently small by attenuating the object-bearing beam, then Equation 3 would certainly be made to hold to great accuracy if this were desired. However, if the fringe contrast is too low, the reconstructed image will tend to be grainy. Good reconstructions are, in practice, possible over a wide range of fringe contrasts.

One feature of interest is that the reconstructed image is positive, that is, it has the same polarity as the original object. If the hologram is contact-printed so as to produce a negative of the original hologram, then this negative hologram also produces a positive reconstruction. However, certain features of the hologram are lost in reproducing a hologram by contact printing and there are more desirable methods of reproducing a hologram and such methods are described in our co-pending application.

Figure 10:
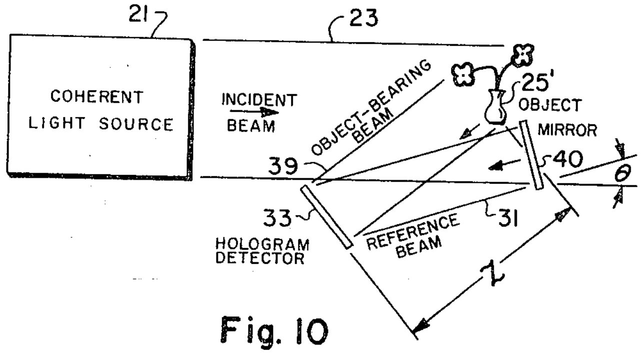
FIG. 10 is a diagram illustrating a method of producing an off-axis hologram from a solid object.

FIG. 10 shows a method of producing a hologram of the off-axis type using an opaque object 25'. The illuminating light, i.e., the incident beam 23, is coherent light from a source such as a laser 21. A diffusion screen (such as the diffusion screen 24 of FIG. 7) may be placed between the light source 21 and the object 25'. The object 25', which may be any complex pattern, reflects light to a photographic plate 33, as shown by the object-bearing beam 39. A portion of the incident beam 33 is reflected to the photographic plate 33 by a mirror 40, as shown by the reference beam 31. The photographic plate is placed any distance $z$ from the object 25' and the incident beam is reflected through the angle $\theta$. The interference of the two beams 39 and 31 produces a hologram on the photographic plate 33. After the plate 33 is developed, the semitransparent plate 33' is placed in the beam 23 of coherent light, as shown in FIG. 9, and the virtual and real images 35 and 37 appear as three-dimensional images. Both images are a reconstruction of the original object. In the reconstruction, the images are positioned at a distance $z$ and at angle $\theta$ as shown in FIG. 9.

In producing holograms, the interference maxima and minima occurring between the two beams consistently occurs at the same point on the detector. With average lasers and emulsions, exposure times are on the order of early conventional photographic exposure times of about ten seconds or more (with pulsed lasers, a hologram is produced with one pulse). If the detector or object moves slightly during exposure, the image is altered. If the movement is not too great, the image formed by the diffraction from the hologram is altered in a manner that is characteristic of the motion itself. This pattern is used to analyze the vibration of an object. The object can be of any shape and its surface can be either specularly or diffusely reflecting.

Figure 11:
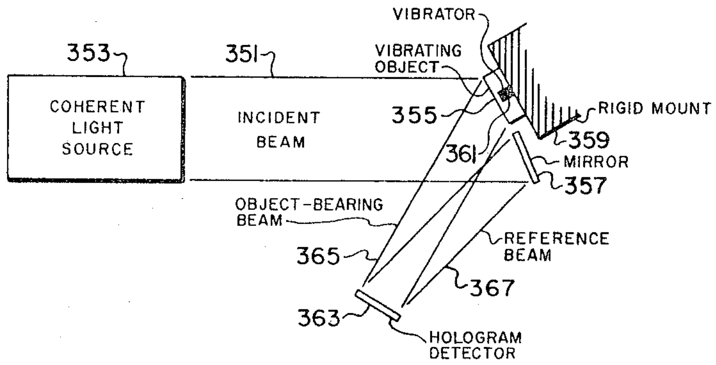
FIG. 11 is a diagram illustrating an off-axis hologram method of vibration analysis.

FIG. 11 shows a method for analyzing the vibration of an object over a selected period of time. An incident beam 351 from a coherent light source 353 is directed onto a vibrating object 355 and a stationary mirror 357. The vibrating object 355 is attached to a rigid mount 359 and vibrated by a vibrator 361. (As a demonstration of the method, the vibrating object 355 may be a 35 mm. film can and the vibrator 361 a solenoid magnetically coupled to the bottom of the film can, with the solenoid connected to a power amplifier driven by an audio signal generator.) A detector 363 is positioned to receive reflections from the object 355, which comprise the object-bearing beam 365; and the reference beam 367 from the miror 357. A hologram is produced with the object 355 vibrating.

Figure 12:
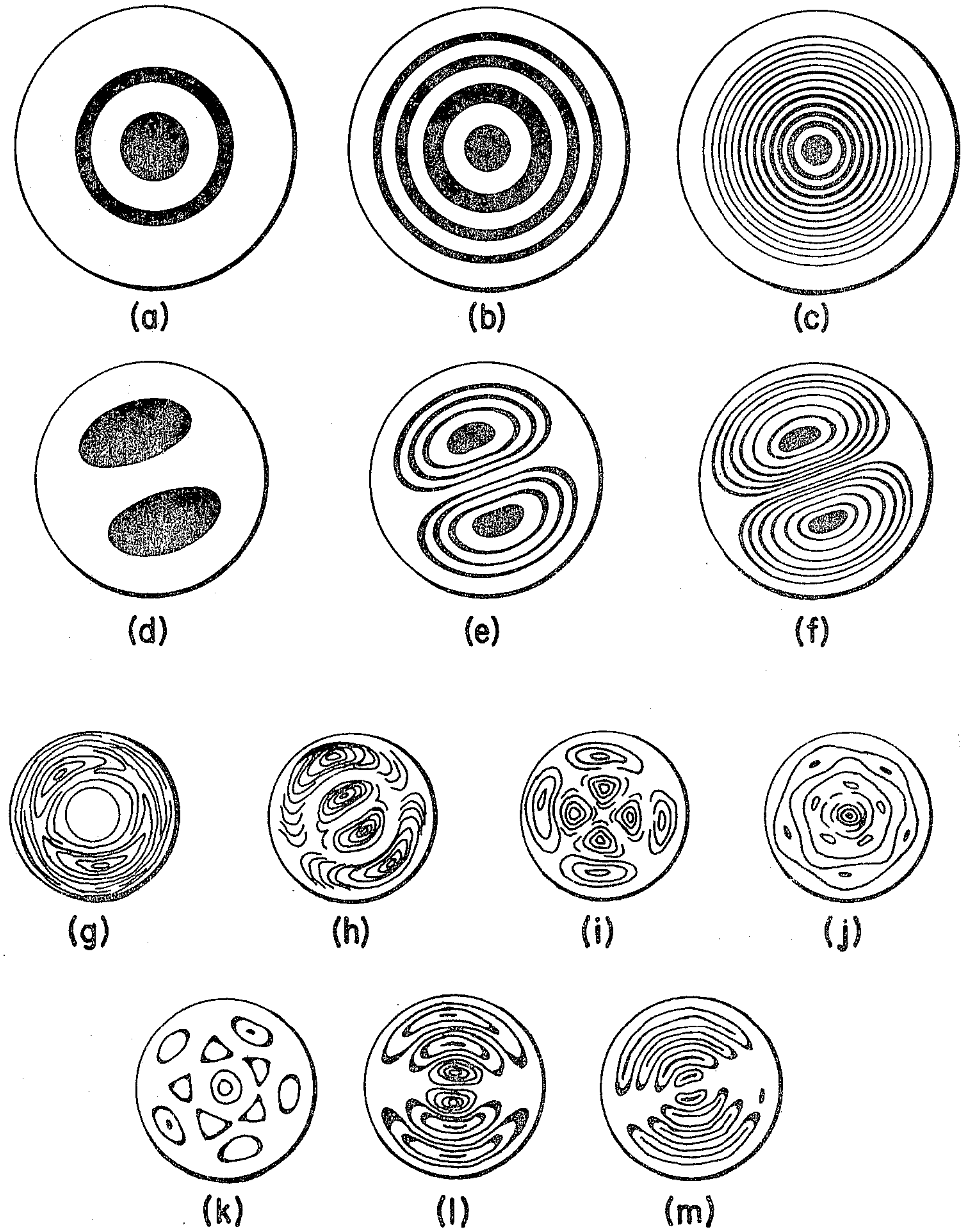
FIGS. 12*a* through 12*m* are diagrams of images showing fringes produced from the vibration of a 35mm film can.

FIGS. 12*a* through 12*m* are replicas of pictures made from hologram reconstructions where a 35 mm. film can was the vibrating object. FIGS. 12*a*, 12*b*, and 12*c* are the result of the film can vibrating at its lowest frequency of resonance and the differences in the patterns are caused by changes in the amplitude of excitation only. The rings are not node lines but rather lines characterizing equal amplitudes of vibration. FIGS. 12*d*, 12*e*, and 12*f* represent the pattern produced at the second resonant frequency with three different amplitudes. Here the line across the middle is clearly a node of vibration of the can, and the contours to either side are contours of constant amplitude of vibration. FIGS. 12*g* through 12*m* indicate various other resonant frequencies of the can as the frequency of excitation was increased.

An analysis of the information stored on the hologram illustrates that the fringes form in the antinodal regions of the images of the hologram produced from vibrating objects. The above-described vibration analysis has widespread applications. Any system that operates by mechanical vibrations may profit from the detailed analysis possible by the method. Examples of such systems are audio speaker diaphragms, musical instruments such as percussion or string instruments and audio transducers of many sorts. Also the method is applicable to larger systems, or models of larger systems, for example, aerodynamic structures, hydrofoils, etc. and in analyzing the vibrations of these systems.

One of the main advantages of the method is that structures for vibration analysis do not need to be modified in any manner. There need not be any lines, fibers, or sensing mechanisms attached to the structure. Also measurements may be made in a vacuum, under water, in a furnace, etc. In general, the analyzed surface need not be attached to the structure under analysis. Moreover, the precision of the measurements may be within a fraction of a micron.

It should be noted that the beam that illuminates the object and the reference beam described with respect to the various methods and apparatus discussed herein need not originate from a single laser since present technology includes, the ability to lock two lasers in a phase so that light from the separate lasers each produces a beam and the beams are coherent with respect to one another.

What is claimed is:

1. A method of analyzing the average vibration of an object over a selected period of time, comprising the steps of:

(a) vibrating the object, (b) directing coherent radiation onto the vibrating object to provide an object-bearing beam from the object, (c) positioning a detector sensitive to said coherent radiation at a distance spaced from the vibrating object and in the path of the object-bearing beam, (d) directing radiation coherent with said first-named coherent radiation as a reference beam onto the detector at a finite angle with respect to the object-bearing beam to produce therewith a pattern of interference fringes on the detector as a hologram of the vibrating object, and (e) illuminating the hologram with coherent radiation as an illuminating beam thereby producing an image of the object.

2. A method of producing a hologram for analyzing the average vibration of an object comprising the steps of:

(a) vibrating the object, (b) directing coherent radiation onto the vibrating object to provide an object-bearing beam from the object, (c) positioning a detector sensitive to said coherent radiation at a distance spaced from the vibrating object and in the path of the object-bearing beam, and (d) directing radiation coherent with said first-named coherent radiation as a reference beam onto the detector at a finite angle with respect to the object-bearing beam to produce therewith a pattern of interference fringes on the detector as a hologram of the vibrating object.

3. Apparatus for producing a hologram for analyzing the average vibration of an object comprising:

(a) means for vibrating the object, (b) means for directing coherent radiation onto the vibrating object to provide an object-bearing beam from the object, (c) means for positioning a detector sensitive to said coherent radiation at a distance spaced from the vibrating object and in the path of the object-bearing beam, and (d) means for directing radiation coherent with said first-named coherent radiation as a reference beam onto the detector at a finite angle with respect to the object-bearing beam to produce therewith a pattern of interference fringes on the detector as a hologram of the vibrating object.

References Cited

UNITED STATES PATENTS 3,083,615 4/1963 El-Sum ------ 73—67.5(H)UX

OTHER REFERENCES

Nondestructive Testing Handbook, Robert C. McMaster, The Ronald Press Co., N.Y., 1959, p. 14/26–14/28, (73–67).

RICHARD C. QUEISSER, Primary Examiner

J. P. BEAUCHAMP, Assistant Examiner

U.S. Cl. X.R.

350—3.5; 356—106

UNITED STATES PATENT OFFICE

CERTIFICATE OF CORRECTION

Patent No. 3,548,643 Dated December 22, 1970

Inventor(s) Emmett N. Leith et al.

It is certified that error appears in the above-identified patent and that said Letters Patent are hereby corrected as shown below:

Column 9, line 20, the last part of the equation shou changed from $(\alpha x \phi)$ to -- $(\alpha x-\phi)$; line 29, the equation sho be changed as follows:

$$(1/2)\ a_o a e^{-j}\ (\alpha x-\phi)\ \text{--.}$$

Signed and sealed this 18th day of January 1972.

(SEAL)
Attest:

EDWARD M.FLETCHER,JR.
Attesting Officer

ROBERT GOTTSCHALK
Acting Commissioner of Pate